Fig. 1 — Roll of pressure-sensitive adhesive tape — may be unwound without delamination or offsetting of adhesive

Fig. 2
- Hydrophilic film backing
- Polyvinyl alcohol-latex primer film
- Normally tacky and pressure-sensitive water-insoluble hydrophobic adhesive

Fig. 3
- Film backing
- Primer film
- Pressure-sensitive adhesive coating
- Removable film liner

Fig. 4
- Removable film liner
- Pressure-sensitive adhesive coating
- Primer film
- Film backing
- Primer film
- Pressure-sensitive adhesive coating

Fig. 5
- Pressure-sensitive adhesive in volatile solvent
- Coating orifice
- Primer coating
- Steam drums for drying primer
- Uncoated film web
- Primer solution
- Driven pull drum
- Adhesive side
- Drying oven
- Wind up roll
- Temporary liner Inventor
Robert Isham Coulter Aug. 31, 1943.     R. I. COULTER     2,328,057
PRESSURE-SENSITIVE ADHESIVE SHEET
Filed Feb. 27, 1941     2 Sheets-Sheet 2

Fig. 6

Hydrophilic film backing
Polyvinyl alcohol coating
Latex coating
Pressure-sensitive adhesive coating

Fig. 7

Polyvinyl alcohol film
Regenerated cellulose film
Polyvinyl alcohol film
Latex coating
Pressure-sensitive adhesive coating

Fig. 8

Regenerated cellulose film
Polyvinyl alcohol film
Polyvinyl alcohol-latex primer
Pressure-sensitive adhesive coating

Fig. 9

Regenerated cellulose film
Polyvinyl alcohol bonding film
Regenerated cellulose film
Polyvinyl alcohol-latex primer
Pressure-sensitive adhesive coating

Fig. 10

Transparent hydrophilic film backing
Printed area of pigmented polyvinyl alcohol
Transparent polyvinyl alcohol primer
Pigmented pressure-sensitive adhesive coating Inventor
Robert Isham Coulter Patented Aug. 31, 1943

2,328,057

UNITED STATES PATENT OFFICE 2,328,057

PRESSURE-SENSITIVE ADHESIVE SHEET

Robert Isham Coulter, St. Paul, Minn., assignor to Minnesota Mining & Manufacturing Company, St. Paul, Minn., a corporation of Delaware Application February 27, 1941, Serial No. 380,769

2 Claims. (Cl. 117—76)

This invention relates to pressure-sensitive adhesive sheets and tapes of the type having a non-fibrous hydrophilic film backing, such as regenerated cellulose ("Cellophane").

An object is to secure improved anchorage of the tacky adhesive coating by employing polyvinyl alcohol as a priming means. A further object is to improve the strength and toughness of adhesive sheets or tapes wherein hydrophilic cellulosic film backings are used, by employing an interposed film or coating comprising polyvinyl alcohol which serves also in producing a strong union of the pressure-sensitive adhesive to the cellulosic film. A further object is to provide pressure-sensitive adhesive tape having certain advantages possessed by tape wherein a polyvinyl alcohol film is employed as the sole backing, but which is less expensive and free from objectionable stretchiness (since for some purposes stretchiness is not only not needed but is undesirable).

By a pressure-sensitive adhesive is meant a normally tacky or non-drying adhesive which adheres by pressing without need of activation by water, solvents or heat. Adhesives of this type, as commonly employed in pressure-sensitive adhesive tapes, are comprised of a blend of a highly cohesive plastic or rubbery base (such as rubber) and a tack-producing material (such as a resin), and may contain a filler or reinforcing material (such as zinc oxide), and sometimes include softening and/or plasticizing agents. The adhesive is highly cohesive so that adhesive tape can be unwound from rolls or removed from surfaces to which temporarily applied without splitting or offsetting of adhesive as the result of internal yielding of the adhesive coating. These adhesives are organophilic, hydrophobic and water-insoluble.

A serious and difficult problem is involved in attempting to bond such water-insoluble hydrophobic adhesive coatings to non-fibrous hydrophilic films having smooth, dense, non-porous surfaces. In the first place, the two types of materials necessarily have a low affinity. Such films contain adsorbed moisture and, in the case of regenerated cellulose films, for example, commonly include a hygroscopic water-soluble softening agent, such as glycerine, which is not compatible with water-insoluble hydrophobic coatings. In the second place, the smooth, dense, non-porous surface of the cellulosic film provides no opportunity for penetration of the hydrophobic coating and hence the absence of mechanical interlocking makes bonding dependent upon chemical affinity which, as has been pointed out, is low in this case. Thus the problem is quite different from that in the art of coating fibrous cellulosic fabrics (such as papers, felts and cloths) wherein a fibrous and porous surface permits of the penetration and mechanical interlocking of an applied coating, and the fibres commonly contain less moisture and generally do not include glycerine or other like flexibilizer.

In the case of normally tacky and pressure-sensitive adhesive coatings of the rubber-resin type, which are water-insoluble and hydrophobic, the adhesive adheres to a regenerated cellulose film with substantially the same strength as it adheres to other surfaces toward which it has no special chemical affinity—such as glass surfaces. Hence there is no substantial preferential bonding to the film backing when the adhesive is directly applied to the surface thereof, and delamination of the adhesive coating may occur when the adhesive sheet or tape is stripped from surfaces to which temporarily applied, or is unwound from rolls thereof without careful handling. In order to provide strong bonding of the pressure-sensitive adhesive coating to a hydrophilic film backing, an interposed primer coating or film is commonly employed. In this art, a "primer" is by definition an interposed layer which causes the pressure-sensitive adhesive layer to be more firmly bonded to the film backing than would be the case if the primer were omitted. The primer may comprise a mixture of a plurality of components, and may be composed of a plurality of layers or stratums which are united together and collectively serve the function.

An object of the present invention is to provide a way of priming non-fibrous hydrophilic films having smooth, dense, non-porous surfaces, so that rubber-resin pressure-sensitive adhesive coatings, and the like, can be thereby bonded to the backing at least about twice as firmly as would be the case if no primer were used, so as to provide a product in which the adhesive coating is non-offsetting under severe or unusual conditions of use. A feature of the invention is that highly transparent and clear adhesive tapes can be made and that the primer is highly resistant to aging, and does not decrease the aging life of the adhesive or of the adhesive tape but on the contrary makes for adhesive tapes having an increased useful life. A further feature is that adhesive tape made in accordance with this invention has improved resistance to the effect of exposure to high humidities.

The invention is not limited to adhesive sheets or tapes having regenerated cellulose film backings, but relates in general to the bonding of hydrophobic pressure-sensitive adhesives to smooth, dense, non-porous, hydrophilic film surfaces. Other examples of hydrophilic films are: Hydrophilic cellulose ethers, including hydroxy alkyl cellulose ethers (such as hydroxy ethyl cellulose), methyl cellulose, and special water-soluble types of ethyl cellulose; which are to be contrasted with the cellulose nitrate, cellulose acetate, and ordinary ethyl cellulose, films of commerce, which are hydrophobic. In addition to such cellulosic films, mention may be made of non-cellulosic films made of plasticized starch, protein films made of gelatine or casein, films made of "Mazein" ("prolamine" found in corn and extracted from corn gluten meal and purified), and films of polyvinyl alcohol.

Moreover, the film need not be the sole backing, but may be laminated (or formed in situ) upon another sheet, such as paper or cloth. Also, the film may be a composite, as for example a film of regenerated cellulose joined on either or both faces with a hydrophilic film of a different type, such as a coating of polyvinyl alcohol, or other film material mentioned above, for example.

The primer of the present invention is formed of a combination of polyvinyl alcohol interbonded with an organophilic material which is compatible with the pressure-sensitive adhesive. The polyvinyl alcohol firmly bonds to the hydrophilic film surface and the said organophilic material firmly bonds to the overlying hydrophobic organophilic adhesive, so that a strong linking together of the film and the adhesive is produced.

Polyvinyl alcohol is commonly manufactured by hydrolyzing a polyvinyl ester such as polyvinyl acetate. Hydrolysis is probably not complete in any case and may be deliberately kept substantially short of completion in order to produce forms which are of limited solubility in water, due to the unsubstituted ester radicals remaining. Also, polyvinyl alcohols may be treated in various ways to incorporate other radicals than hydroxy while still retaining hydrophilic properties, as by partial acetylation, or treatment with an aldehyde such as acetaldehyde, formaldehyde or butyraldehyde. For present purposes, the term "polyvinyl alcohol" applies in any case where there are sufficient hydroxy radicals in the molecule to impart the hydrophilic property which causes firm bonding to hydrophilic films when an aqueous solution or dispersion of the polyvinyl alcohol is applied to the film and dried, and the term applies even though the polyvinyl alcohol has been treated or insolubilized after application to the film to render it more moisture-resistant.

The organophilic material employed in securing union of primer to adhesive layer, may be any organophilic material which is compatible with the particular pressure-sensitive adhesive used. In the case of rubber-resin adhesives, either rubber or compatible resin, or both, may be utilized in the primer, for example. The "rubber" may be natural rubber or synthetic rubber or a rubbery synthetic polymer (each of which is an elastomer). As to the usage of the term "elastomer," see Industrial and Engineering Chemistry, vol. 31, pages 941–945, August, 1939. The organophilic material may be dispersed in the aqueous solution of polyvinyl alcohol, or may be dissolved in a volatile organic solvent and the solution emulsified with the aqueous polyvinyl alcohol solution so that one or the other vehicle (preferably the water) constitutes the external phase and the other a dispersed internal liquid phase.

In either case the resultant liquid, containing both the polyvinyl alcohol and the organophilic bonding material in dispersed and intermingled state, is used to coat the hydrophilic film and upon drying will be firmly anchored to the film. In any case the range of proportions of the two essential components within which true priming action is secured can be readily determined by simple trial, and will of course depend somewhat upon the particular film, the particular organophilic component, and the particular pressure-sensitive adhesive, which are used. In general, it has been found that 15 to 300 parts by weight (dry basis) of polyvinyl alcohol per 100 parts by weight of the organophilic bonding component may be used to advantage to secure at least about a 50% increase in anchorage of the adhesive coating, although this is not to be regarded as a limitation since proportions outside this range have proved satisfactory in various cases. Generally speaking, experience has shown that 10–600 parts of polyvinyl alcohol per 100 parts of the organophilic component represents the broad range within which sufficient priming action is obtained to justify the expense of priming the backing.

A second way of forming the primer is to prepare an aqueous dispersion of the organophilic bonding material separate and apart from the aqueous solution of polyvinyl alcohol. The film is first coated with the polyvinyl alcohol solution and then, while this coating is still in a wet or moist condition, the aqueous dispersion of the organophilic bonding material is applied thereover, followed by drying. The two coatings merge together and an interbonding of the two components of the composite primer results. The union may be strengthened, if desired, by employing a polyvinyl alcohol solution in which a minor proportion of the organophilic material is dispersed, and/or a dispersion of the organophilic material in which a minor proportion of polyvinyl alcohol is included. A further way, which may if desired be utilized in conjuction with the foregoing expedient, is to include in the organophilic dispersion a substance compatible with the polyvinyl alcohol coating and which exerts a solubilizing action upon the polyvinyl alcohol, such as triethanolamine, foramide or acetamide. Such substance may also be included in the polyvinyl alcohol solution, or in both.

A preferred aqueous dispersion of organophilic bonding material which may be employed in carrying out this invention is latex. The latex emulsion may be a concentrated latex milk containing uncured latex rubber; but use may be made of vulcanized latex milk, such as is exemplified by "Vultex" (latex milk vulcanized by a special process which avoids coagulation). Use may also be made of equivalent artificial aqueous dispersions of rubber or of artificial or synthetic rubber-like materials (many of which are customarily referred to as being artificial latexes). A further example is the use of an aqueous dispersion of isobutylene polymer ("Vistanex"), this material being readily compatible with rubber-resin pressure-sensitive adhesives in either the lower polymer form (which is plastic and tacky) or higher polymer form (which is rubbery and non-tacky).

Various other organophilic resins in water-dispersed form may be used as heretofore indicated. Thus dispersions of rosin, ester gum, hydrogenated rosin, hydrogenated ester gum, hydrogenated coumarone and indene resins, can be readily prepared, as is well known in the resin art, and may be used to provide the organophilic bonding material compatible with the pressure-sensitive adhesive. The inclusion of ammonia or an ethanolamine (such as triethanolamine), for example, will insure ready blending with polyvinyl alcohol solutions.

Also mixtures of different suitable organophilic materials can be used by mixing dispersions thereof, or by simultaneously dispersing two or more different organophilic materials, or by blending two or more and dispersing the blend. Thus an ammonia-rosin emulsion may be mixed with latex milk, for example, and can be readily incorporated with a polyvinyl alcohol solution. Or rubber and a resin, such as ester gum, may be combined on a rubber mill and the resultant blend dispersed in water. These are given as illustrative of combinations of any two or more of the various organophilic bonding materials which have been mentioned.

Also, as heretofore indicated, one or more of the organophilic materials may be dissolved in, or softened by, a volatile solvent and then emulsified in water. The emulsion may also include one or more organophilic materials directly dispersed in water without being in a solvent phase.

The polyvinyl alcohol may be substituted for in part, or augmented by, a hydrophilic colloidal agglutinant of different kind, such as casein, isinglass, gelatine, soy bean protein glues, "Mazein" (corn prolamine), dextrin, methyl cellulose, water - soluble polyhydric - alcohol/polybasic - acid resin, urea-aldehyde resin, water-soluble alkyd resin salt, or mixtures thereof. This may be of true value in reducing cost while at the same time obtaining the advantages of polyvinyl alcohol to a substantial extent. Furthermore, the polyvinyl alcohol may serve a valuable protective function in obtaining stable dispersion. For example, polyvinyl alcohol used in conjunction with casein serves to inhibit putrefaction and spoilage of the primer solution. These other hydrophilic colloidal agglutinants bond to hydrophilic films, although when used alone are not as good a polyvinyl alcohol. The inclusion of ammonia or an ethanolamine may be desirable in some cases to insure stable admixtures.

The accompanying drawings illustrate various aspects of the invention in diagrammatic fashion as follows:

Figure 4 shows a schematic edge view of a double-coated pressure-sensitive tape having a liner attached to one of the adhesive faces. The composite may be wound in roll form, and desired lengths of tape may be unwound from time to time and the liner stripped off for use of the double-coated tape. The hydrophilic film backing in this form is coated on both faces with the primer and a pressure-sensitive adhesive coating is applied to each side. Such double-coated tape has utility for many purposes; as for binding two surfaces together, which may later be separated again without transfer of the adhesive from its backing. By using a transparent adhesive, a composite adhesive tape may be made which is transparent, and may be used as an "invisible" splice for transparent sheets, for example. In general, such tape may be used in place of rubber cement for many sealing and joining purposes, having the advantage that it may be applied more conveniently and without the user being bothered with solvent fumes, and separation can later be effected, when desired, without the adhesive remaining upon the surfaces to which the tape was applied. It will be evident that the powerful bonding of the pressure-sensitive adhesive to its backing, by virtue of the primer, makes possible the success of this type of adhesive sheeting.

The polyvinyl alcohol film on the face side, while still in a wet or moist state, has applied to it a latex coating and, after drying, a pressure-sensitive adhesive coating is applied thereover, as described in connection with Fig. 6. This polyvinyl alcohol film thus serves the dual role of being a part of the backing and being a part of the primer serving to link the pressure-sensitive adhesive to the regenerated cellulose film. Either or both of the polyvinyl alcohol films may include coloring material. To further increase bonding between the inner polyvinyl alcohol film and the latex coating, the expedient described in connection with Fig. 6 may be used, i. e., the inclusion of latex or other organophilic bonding material.

After forming of the composite backing film, the polyvinyl alcohol film may be coated with a polyvinyl alcohol-latex type of primer, and after drying of the primer, a pressure-sensitive adhesive is applied thereover.

A polyvinyl alcohol-latex type primer is applied to the regenerated cellulose film and, after drying, a pressure-sensitive adhesive is applied thereover.

All of the illustrative tape structures set forth in the drawings may be utilized in making transparent pressure-sensitive adhesive tape by employing a transparent pressure-sensitive adhesive. Colored tapes can be made not only by including coloring material in polyvinyl alcohol layers as described (in which case the inclusion of zinc oxide or other opacifier in the pressure-sensitive adhesive may be desirable in order to back up the color where an opaque tape is being made), but by including coloring material (dye or pigment) in the pressure-sensitive adhesive which will be visible through the backing and primer.

Figure 10:
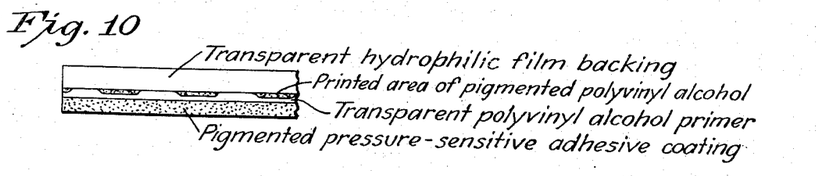
Figure 10 shows in diagrammatic fashion an adhesive sheet or tape having a transparent hydrophilic film backing (such as regenerated cellulose) which has been coated in certain areas with a pigmented polyvinyl alcohol forming a design, symbols or words, and which may be applied by means of an intaglio printing cylinder or by offset printing or in any other suitable way, using a pigmented polyvinyl alcohol water solution "ink." The use of such polyvinyl alcohol ink makes for a firm anchorage of the printed matter. Water vehicle inks are well known in the printing art and the same types of pigments and dispersing aids may be used, being mixed into the polyvinyl alcohol solution by use of a pebble or ball mill, for example. A transparent primer coating of polyvinyl alcohol type is applied over the printing and anchors firmly to both the printed areas and to the interposed exposed backing areas. A pigmented pressure-sensitive adhesive coating is applied thereover and provides a background visible through the backing in the unprinted areas. Thus if a red printing ink has been used, and zinc oxide has been used for pigmenting the adhesive, the tape will show red printing against a white background, and in addition the white adhesive will "back up" the red printed areas so that they will appear more opaque and deeper in color. Attractive package seals, and stickers and labels, may be made in this way, and because of the firm inter-bonding of the constituent elements of the structure, such tape may be unwound from rolls and removed from surfaces to which temporarily applied without the adhesive pulling off from the backing. The primer may also include coloring material, in which case a white pigmented adhesive may be used to back up the underlying colored areas.

This same principle may of course be used in various other ways. The backing may be printed in several colors. The backing may be entirely covered with printing so as to leave no uncovered portions, in which case the printing serves as the sole priming means in contact with the backing. The polyvinyl alcohol ink may include latex or other organophilic bonding material, in which case no further primer is needed if the ink covers all, or most of, the backing surface. A backing such as a regenerated cellulose film may be precoated with a transparent polyvinyl alcohol film, or with a primer film containing both polyvinyl alcohol and an organiphilic bonding material, upon which the printing is applied.

Figures 1, 2:
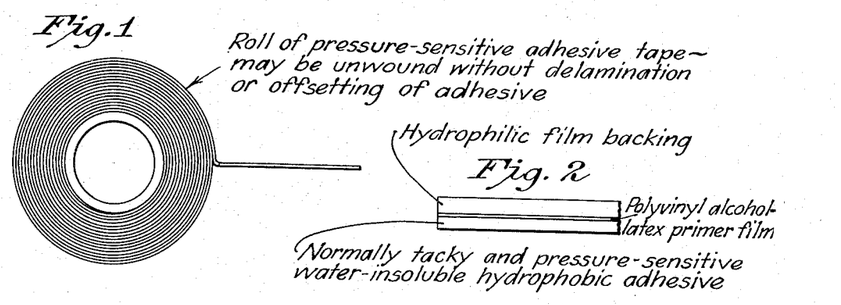
Figure 1 shows a roll of pressure-sensitive adhesive tape.
Figure 2 shows a schematic enlarged edge view of the tape, wherein a non-fibrous hydrophilic film backing (such as regenerated cellulose film) is coated on one side with a polyvinyl alcohol-latex primer upon which there is a coating of a normally tacky and pressure-sensitive water-insoluble hydrophobic adhesive (such as a pressure-sensitive adhesive of the rubber-resin type). The composite adhesive tape may be transparent, so that it may be applied to surfaces without concealing the coloring or markings thereof, in which case a transparent adhesive will be used. An adhesive containing coloring material may be used, which will be visible through the film backing and primer, to make a colored adhesive tape, the optical effect being such that the backing itself will appear colored.
Figure 3:
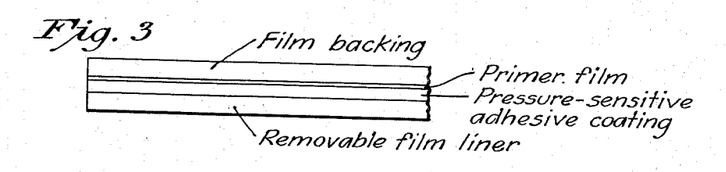
Figure 3 shows a schematic edge view of an adhesive sheet or tape wherein the pressure-sensitive adhesive covers part or all of the area of the film backing, being bonded thereto by an interposed polyvinyl alcohol-latex primer or the like, characterized by a removable liner (such as holland cloth or regenerated cellulose film) contacting and covering the adhesive surface. The liner may be grasped and be peeled or stripped off without danger of delamination of the adhesive from its backing, owing to the firm bonding produced by the primer, notwithstanding that the backing has a smooth, dense, nonporous surface.
Figure 5:
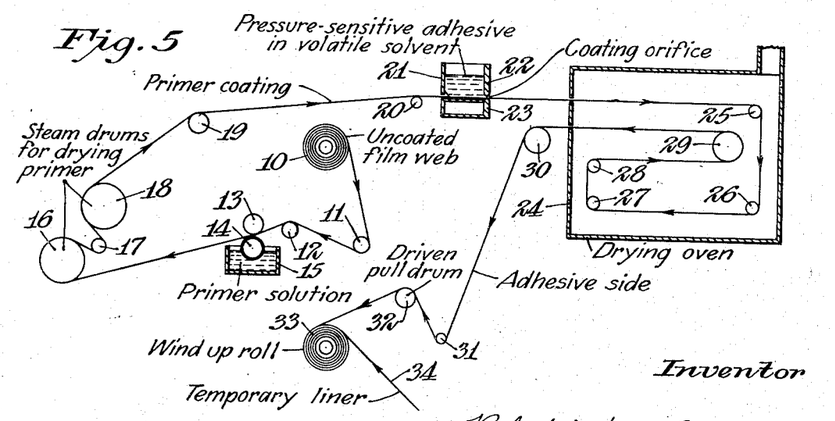
Figure 5 shows in diagrammatic fashion an illustrative system for the continuous making of pressure-sensitive adhesive sheeting, involving the steps of coating a regenerated cellulose film web (for example) with the aqueous primer solution; flash-drying the primer coating in a manner which produces a flat, unwrinkled and unwarped sheet; applying a coating of adhesive solution (such as rubber-resin pressure-sensitive adhesive dissolved in a volatile hydrocarbon solvent) upon the primer surface; passing the web through a drying oven to evaporate the solvent; and winding up the resultant adhesive sheeting into a roll with a temporary liner wound in as a separator for the turns of the roll. The roll may then, when desired, be unwound by pulling out the liner, and the adhesive sheeting passed to a slitting machine for slitting into desired tape widths and windings into rolls of desired length for sale.
Figure 6:
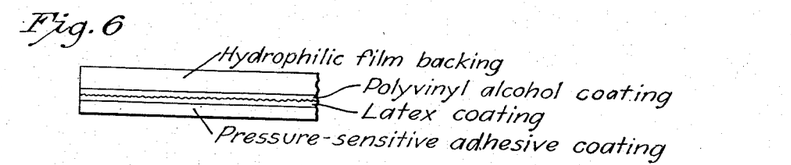
Figure 6 shows a schematic edge view of an adhesive sheet or tape wherein a hydrophilic film backing is first coated with polyvinyl alcohol in water solution and then, while this coating is still in a wet or moist state, a coating of latex or the like (in aqueous dispersion) is applied, followed by drying. The two coatings become bonded together in this way and constitute, in combination, the primer. A pressure-sensitive adhesive is applied over the dried latex coating. Excellent adhesive tape of good transparency can be made in this way. In addition to its priming function, the polyvinyl alcohol coating, if applied to a regenerated cellulose film (for example), serves to increase the toughness and strength of the composite tape, particularly if it is made of somewhat greater thickness than is needed for mere priming purposes. The polyvinyl alcohol solution may have a dye or pigment incorporated therein so that the dried coating will color the tape. A stronger union of the two primer coatings can be obtained, if found desirable, by including a minor proportion of latex (or equivalent) in the polyvinyl alcohol solution, and/or including a minor proportion of polyvinyl alcohol (or other hydrophilic colloidal agglutinant) in the latex dispersion.
Figure 7:
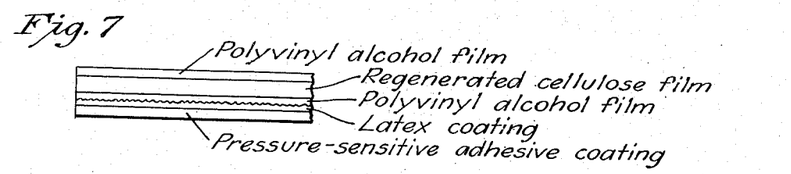
Figure 7 shows a schematic edge view of an adhesive sheet or tape in which the backing is formed of a thin film of regenerated cellulose carrying on the back face a film of polyvinyl alcohol formed in situ by casting or coating, and carrying a similar film of polyvinyl alcohol on the face side. This composite may have a total thickness comparable to that of the regenerated cellulose film commonly employed as the sole backing, so as to avoid thickening the tape. The regenerated cellulose film serves as a casting or coating base for the polyvinyl alcohol, results in a backing less costly than if the backing were composed solely of a polyvinyl alcohol film, and prevents the backing from being stretchy; while the polyvinyl alcohol layers result in a great increase of toughness and tear-resistance and make for greater flexibility, and the one on the face side also serves as a part of the primer. Instead of using the ordinary type of regenerated cellulose film, use may be made of film having a much lower content of glycerine, since the film is thin and the integral polyvinyl alcohol films will protect the composite from cracking or breaking when bent or flexed.
Figure 8:
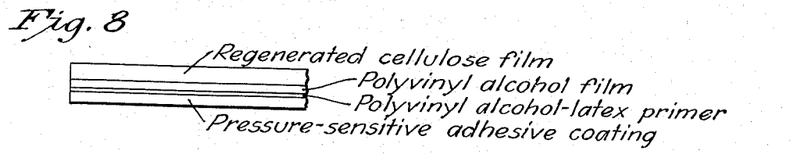
Figure 8 shows a schematic edge view of an adhesive sheet or tape having a composite backing film comprised of two hydrophilic film layers, the back film being a regenerated cellulose film and the inner film being composed of polyvinyl alcohol which has been cast or coated thereupon as an aqueous solution and then dried. As described in connection with Fig. 7, in this case also the back side of the regenerated cellulose film may be additionally coated with a polyvinyl alcohol film.
Figure 9:
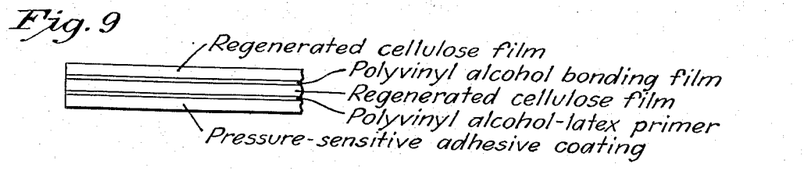
Figure 9 shows a schematic edge view of an adhesive sheet or tape having a composite film backing formed of two thin films of regenerated cellulose (for example of 0.9 mil thickness each) bonded together by a thin interposed film of polyvinyl alcohol. This laminated film may be formed by applying a thin coating of polyvinyl alcohol to one or both of the cellulose films and then pressing together, followed by heating. Drying of the interposed polyvinyl alcohol is facilitated by the water content being absorbed by the regenerated cellulose films and thence diffusing outwardly to the atmosphere. This expedient makes possible the use of thin regenerated cellulose films (which are cheaper per pound than thick films) to secure a backing of desired thickness. In addition, a tougher tape is produced, and this feature can be increased by employing a polyvinyl alcohol film of several tenths of a mil thickness. The interposed polyvinyl alcohol film may include coloring material to produce colored tape, and may include modifying agents such as plasticizers, latex and resins.

Referring now to Figure 5 for a more detailed description of an illustrative system adapted to the making of adhesive tape of the kind shown in Figs. 1 and 2, a web of regenerated cellulose film sheeting (or the like) is drawn from supply roll 10 to and around idler roller 11 and thence over idler roller 12 and down between coating rollers 13 and 14, roller 14 being located below roller 13 and having a rubber surface. Roller 14 dips into a bath of the aqueous primer solution and transfers it to the lower face of the web. These rollers are tightly set so that only a thin coating of primer solution remains upon the web as it leaves.

The web then passes to and around steam-heated drum 16, thence back to and around idler roller 17, and thence back to and around steam-heated drum 18, following which it moves for some distance through the air to the adhesive coater, to permit of cooling, being supported and guided by idler rollers 19 and 20. The web contacts said steam-heated drums on its unprimed face, and is thereby quickly heated so as to cause flash-drying of the primer on the outer face. In a particular embodiment which has been employed, it has been found that heating of the drums to produce in operation a drum surface temperature of about 180°–240° F. has given satisfactory results, the web contacting the drums for a total length of 36 inches, and a total period of 1½ to 3 seconds, depending upon the rate of travel of the web (which has been 20 to 40 yards per minute). The web is drawn through the mentioned equipment and is thus maintained under tension, and at the same time is held flat by the rollers and heating drums, and this with the flash-drying results in a primed web which is flat and unwrinkled and remains this way. If a regenerated cellulose film web were merely coated with the aqueous primer solution and dried without special measures being taken, it would buckle and curl and wrinkle to an extent making it unusable, and could not afterwards be flattened out successfully.

The primed web, having the primer upon the upper face, is then drawn through the adhesive coater 21; where its upper face is contacted by a viscid mass of pressure-sensitive rubber-resin adhesive dissolved in a volatile hydrocarbon solvent (for example) and the coated web is drawn out between doctor blades 22 and 23 to give a uniform coating of desired thickness. The coated web then passes into drying oven 24 for solvent removal, moving to the back of the oven and down over idler roller 25 to the lower part of the oven, thence around idler roller 26 to the front of the oven and up around idler roller 27 to idler roller 28, thence back toward the rear of the oven and around cold roll 29 and thence passes to the front of the oven and out, following which it passes down over cold roll 30. The adhesive face of the web contacts cold rolls 29 and 30 and is thus kept from becoming unduly soft from the heating.

After leaving the last-mentioned cold roll, the adhesive web, which bears a tacky and pressure-sensitive adhesive coating from which the solvent has been removed, passes down to and around idler roller 31 and thence up to and around driven pull drum 32, which is contacted by the tacky adhesive face of the web. It is this drum which pulls the web through the entire precedent equipment. The adhesive sheeting then moves to driven wind up roll 33, where a temporary liner 34 may be fed in to separate the turns if desired. The adhesive sheeting may thereafter be prepared for sale in tape rolls, by slitting and rewinding.

Figure 4:
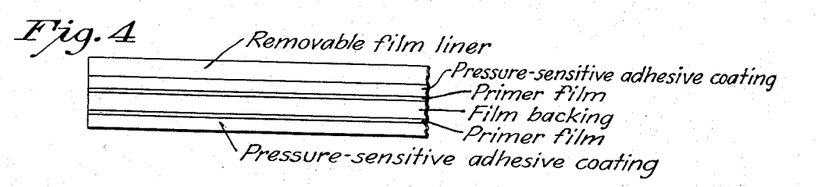

It will be obvious that when it is desired to prime the film web on both faces (as in the structure shown in Fig. 4), that this can be accomplished by using two priming units in series, for example, so that primer solution is applied to one face, dried, and then to the other face and that dried. Or if only one unit is available, the web can be primed on one face, wound up in a roll, and then sent through the unit again so as to prime the other face. The web, primed on both faces, can be double-coated with adhesive by being drawn through an adhesive bath and thence between a pair of doctor blades or a pair of squeeze rolls, which are spaced to give the desired coating thickness. If a double-coated tape having a liner is to be made, the double-coated web as it moves to the slitting means may be joined by a liner web moving from its supply roll into contact, and the composite then slit and the tapes wound into suitable rolls with the liner on the outside of the turns.

EXAMPLE 1

| | Parts by weight |
|---|---|
| Polyvinyl alcohol | 1.87 |
| Formaldehyde solution (40%) | 2.33 |
| Ammonium hydroxide (28% NH$_3$) | 2.80 |
| Rubber latex (60% rubber) | 6.25 |
| Water | 18.75 |

This example illustrates a primer solution well adapted for use in the coating system described in connection with Fig. 5, and which contains 50 parts polyvinyl alcohol per 100 parts rubber latex solids (dry basis).

In this formula a suitable polyvinyl alcohol which has been found to be very satisfactory is the cold-water-soluble type having a molecular weight such that a 4% aqueous solution at 20° C. has a viscosity of about 20 centipoises ("medium viscosity" form). An example of a commercially available polyvinyl alcohol of this kind is the RH-488 grade sold by E. I. du Pont de Nemours & Co. (Inc.), of Wilmington, Delaware. This form has also been found very satisfactory in each of the succeeding examples. It will of course be understood that this is given only by way of example and not limitation. Thus low viscosity and high viscosity forms may be used, or mixtures of different viscosity forms.

The polyvinyl alcohol is dissolved in the water by churning overnight, but may be dissolved more quickly by using warm water. The formaldehyde and ammonium hydroxide are then added, reacting to form hexamethylene tetramine. The latex milk is then slowly stirred in. The resultant primer solution is very stable and may be made up in large batches because of its stability and excellent keeping qualities. There is no putrefaction such as occurs upon exposure to air for several days (in open containers or coating reservoirs) in the case of priming solutions of the casein-latex type heretofore used. Thus it has been noticed that even after several weeks standing in open buckets or drums, the priming solution was in excellent condition for use and had no taint.

An equivalent primer solution can be made by directly adding hexamethylene tetramine to the polyvinyl alcohol solution.

A rubber anti-oxidant, such as beta-naphthol, may be included if desired, but has not been found necessary in obtaining adhesive tape having a long aging life.

Upon drying of the applied primer coating (as in the Fig. 5 system), the hexamethylene tetramine decomposes to yield formaldehyde and this exerts an insolubilizing action upon the polyvinyl alcohol, probably through conversion of some hydroxy radicals to formal radicals, i. e. the polyvinyl alcohol is partly transformed into polyvinyl formal; but without any apparent weakening of the bond between primer and backing film. The result is that the primer is made much more resistant to moisture, which is of great importance in this type of adhesive tape owing to the presence of adsorbed moisture in the hydrophilic film backing and to the permeability of the backing to moisture of humid atmospheres to which exposed.

This feature can be easily demonstrated in the following way: Two adhesive tapes were made up having regenerated cellulose film backings of 1.8 mils thickness coated with a primer film of about 0.2 mil thickness, upon which has been applied a rubber-resin pressure-sensitive adhesive coating (as per Adhesive Example 1 hereinafter set forth). In one case the primer of the foregoing formula was used, in the other case the formaldehyde and ammonium hydroxide were omitted; both primers being applied using the Fig. 5 system; so that conditions were identical except for omission of the insolubilizing action in one case. Two days after being made, the two different adhesive tapes were applied to a tin plate and pressed down firmly with a roller. The backs were wiped for 20 seconds with a moist cloth, and the tapes were then stripped off. In the case of the tape having the insolubilized primer, the tape came away clean without any adhesive being left on the tin plate; but in the other case there was complete delamination so that the adhesive coating remained on the tin plate.

This feature of insolubilizing the primer is of great practical value since in many parts of the country high humidities prevail during large parts of each year, and it is of great importance that the primer be resistant to the effects of such high humidities. The present invention provides such a primer and yet the insolubilizing procedure in no way interferes with the clarity of transparent adhesive tape, either initially or upon exposure to sunlight, and does not deteriorate the rubber of the primer and of the pressure-sensitive adhesive coating. In fact adhesive tape having a backing of regenerated cellulose film and a rubber-resin adhesive has, for some unknown reason, been found even more resistant to discoloration and deterioration by ultra-violet light when this formaldehyde treatment of the primer is used than when it is omitted.

A desirable feature of the present type of primer is that it can be used in making transparent composite sheets of great clarity, and that it can be made of minute thickness which does not add appreciably to the thickness of the composite, thus also making for low cost. The primer film is very flexible, tough, and extensible, and anchors with great firmness. Thus a film of regenerated cellulose, having such primer film applied thereto, can be bent, creased and flexed without cracking or rupturing the primer film and bond. The extensibility of the primer is very advantageous in connection with tape backings which are stretchy, such as backings of polyvinyl alcohol film.

In priming regenerated cellulose films in the making of pressure-sensitive adhesive tape, for example, one pound of the primer solution set forth in this example will satisfactorily coat 100-200 square yards of surface to yield a dried primer film of approximately 0.1 to 0.2 mil thickness.

The surface of the backing film, when the primer of this example is used, is contacted by a two-phase composition of matter; that is, is contacted both by polyvinyl alcohol particles and by rubber particles; in addition to such other phases or particles that may be present.

EXAMPLE 2

Polyvinyl alcohol ___________________ 1.90
Rubber latex (60% rubber) ___________ 6.33
Water _______________________________ 21.77

The polyvinyl alcohol is of the same kind used in the preceding example formula and is made into solution in the same way, and the latex milk is then stirred in. It may be mentioned that the polyvinyl alcohol acts as a protective colloid and further stabilizes the dispersion of latex particles.

This primer solution may be applied in the same way as the one of the preceding example. Although no insolubilizing agent is included, good adhesive tapes can be made and under ordinary room conditions the anchorage of adhesive will be fully adequate.

However, insolubilization can be produced by subjecting the primer film (after drying or semi-drying) to the action of a formaldehyde solution or gas, as by applying a formaldehyde solution to the coating, or dipping the entire coated sheet in a formaldehyde bath, followed by drying before applying the adhesive coating. Other aldehydes can be used in place of part or all of the formaldehyde, such as acetaldehyde and butyraldehyde. The invention is not limited to aldehydes as, for example, desirable results may be obtained by substituting other insolubilizing agents in whole or in part for the aldehyde. However, the use of an aldehyde has been found of particular value because of its effectiveness, ease of use, non-impairment of the clarity of transparent tapes, and contribution to the general aging life of the tape.

In order to show the degree of bonding secured, and the effect of varying the proportion of polyvinyl alcohol to latex, a series of tests were made wherein various samples of pressure-sensitive adhesive tape were used involving differing ratios and different hydrophilic backing films. The bonding strengths were quantitatively compared by using a testing machine provided with a screw driven platform. A length of the adhesive tape to be tested is secured to the platform with the adhesive side out. Another length of strong paper-backing rubber-resin adhesive tape is placed with its adhesive face in contact with the adhesive face of the sample so that the two adhesive coatings cohere, being pressed firmly together with a roller. The end of the outer tape is drawn back at an angle of approximately 180° and is connected by a string to a device for measuring tension, such as a spring scale. The platform is then driven at a constant rate (in these tests 7.5 feet per minute), with the result that the second tape is stripped away from the test sample tape, carrying with it the adhesive of the tape being tested. If the anchorage of the adhesive to the primer is greater than the anchorage of the primer to the tape backing, the primer will also be stripped off. If the anchorage of the primer to the adhesive and to the backing is greater than the cohesive strength of the adhesive, the adhesive will split, and it will only be known that the actual anchorage figure is greater than that measured. A measure of priming efficiency is obtained by making a comparison with tape having the same backing and adhesive but with no primer. In these tests, a pressure-sensitive adhesive of the kind set forth hereinafter as "Adhesive Example 1" was used, and a primer coating of 0.1–0.2 mil thickness was employed, made in accordance with the formula of the present example, except that various ratios of polyvinyl alcohol to latex were employed.

The following table sets forth the measured values of the force required for stripping, the first column giving the parts by weight of polyvinyl alcohol per 100 parts latex rubber (dry basis), and the stripping force being converted to ounces per inch width of the tape tested. In each case several tests were made and the highest consistent figure is given. The polyvinyl alcohol film was cast from a solution of hot-water-soluble medium-viscosity polyvinyl alcohol, exemplified by du Pont RH–349 grade, and was stretchy. A cold-water-soluble, medium viscosity, polyvinyl alcohol was used in making up the primers.

| Parts polyvinyl alcohol per 100 parts rubber in primer | Stripping force for each kind of film backing (ounces per inch width) | | |
|---|---|---|---|
| | Regenerated cellulose | Methyl cellulose | Polyvinyl alcohol |
| 15 | 38 | 34 | 34 |
| 30 | 52 | 56 | 56 |
| 100 | 72 | 52 | 64 |
| 300 | 40 | 36 | 34 |
| 600 | 32 | 26 | 24 |
| No primer | 24 | 22 | 20 |

In each case where 15 parts polyvinyl alcohol were used, the adhesive and primer were both pulled off; when 30 or 100 parts were used there was splitting of the adhesive (showing the primer bond to be higher than the figures given); and when 300 or 600 parts were used the adhesive was pulled away from the primer. This shows that the primer has greater affinity for the backing or for the adhesive depending upon the proportion of polyvinyl alcohol, and incidentally proves that anchorage of the primer to the film backing depends primarily upon the polyvinyl alcohol component and that anchorage to the adhesive coating depends primarily upon the latex rubber component.

EXAMPLE 3

| | |
|---|---|
| Polyvinyl alcohol | 0.90 |
| Casein | 1.00 |
| Formaldehyde (40%) | 2.33 |
| Ammonium hydroxide (28%) | 2.80 |
| Beta-naphthol | 0.05 |
| Rubber latex (60%) | 6.25 |
| Water | 18.75 |

The polyvinyl alcohol is dissolved in half the water and half the ammonium hydroxide is added. The casein is soaked in the other half of the water for ½ hour at 100° F., then the other half of the ammonium hydroxide is added, the temperature is raised to 125° F., and the batch mixed until the casein is thoroughly dissolved, and the beta-naphthol is added. The polyvinyl alcohol solution is then stirred in and the formaldehyde is added. The latex is then slowly stirred in, with continued mixing to secure a uniform dispersion.

This primer solution provides a primer having approximately the same bonding strength and moisture resistance as the primer of Example 1.

The polyvinyl alcohol aids in maintaining a stable composition and decreases the tendency of the casein to putrefy. It makes for a tougher primer film and one which is more extensible. The casein reduces the cost, being considerably cheaper than polyvinyl alcohol at this time.

The beta-naphthol acts both as a casein preservative and as an anti-oxidant for the rubber, but may be omitted if desired.

EXAMPLE 4

Part A

| | |
|---|---|
| Isobutylene polymer | 100 |
| Stearic acid | 4 |
| Triethanolamine | 2 |
| Water | 130 |

Part B

| | |
|---|---|
| Polyvinyl alcohol | 100 |
| Formaldehyde (40%) | 125 |
| Ammonium hydroxide (28%) | 150 |
| Water | 1000 |

Part A: Melt the stearic acid and triethanolamine together in a steam jacketed kettle and work in the isobutylene polymer slowly with good mixing until thoroughly homogenized, the temperature of the melt being brought to about 190° F. and the stirrer speeded up to about 1000 R. P. M. Heat the water to about 190° F. and add gradually while continuing vigorous agitation. During this process the emulsion will invert so that the water forms the continuous phase. After a smooth emulsion is formed, the steam is turned off and the emulsion is stirred gently until cooled to room temperature. A suitable isobutylene polymer is represented by "Vistanex No. 6" (sold by Advance Solvents & Chemical Corp., New York city), which is plastic and sticky.

Part B: This may be prepared by churning the polyvinyl alcohol overnight with the water and then adding the formaldehyde and ammonium hydroxide.

Part B is then slowly stirred into Part A with continued mixing until homogeneous.

As a variation of this formula, in making part A, instead of using 100 parts of isobutylene polymer, use may be made of 50 parts isobutylene polymer and 50 parts of hydrogenated indene resin (a clear, transparent, solid resin exemplified by "Nevillite Resin," sold by the Neville Co., Pittsburgh).

As a further variation, latex may be incorporated with either of the foregoing so as to include an elastomer in the primer and obtain greater cohesiveness.

EXAMPLE 5

| | |
|---|---|
| Polyvinyl alcohol | 10 |
| Formaldehyde (40%) | 12 |
| Ammonium hydroxide (28%) | 15 |
| Water | 90 |

This solution is suitable for use in providing polyvinyl alcohol films for laminating or coating films of regenerated cellulose or the like as indicated by Figs. 6, 7, 8 and 9 (and accompanying descriptions). The water content can be varied to produce the desired coating consistency. Drying of the film, as by using steam heated rolls of the general type shown in Fig. 5, results in the formaldehyde rendering the polyvinyl alcohol film more moisture-resistant. Modifying agents may be included, such as formamide or acetamide to serve as a plasticizer. Latex milk, stabilized with ammonia, may be readily included, and even in small proportions will serve to give increased anchorage to a superposed coating of latex as in the structures illustrated in Figs. 6 and 7. The formaldehyde and ammonium hydroxide may be omitted; thus, for example, satisfactory results have been obtained with a straight 15% solution of polyvinyl alcohol and water, either of the low viscosity or medium viscosity type. The low viscosity type has a molecular weight such that a 4% solution has a viscosity of 5 centipoises at 20° C., and is somewhat more satisfactory than the medium viscosity type for forming polyvinyl alcohol films upon regenerated cellulose films. However, the use of a higher viscosity type, either alone or in admixture with a type of lower viscosity, is not precluded.

EXAMPLE 6 (INK)

| | A | B |
|---|---|---|
| Polyvinyl alcohol | 7.7 | 7.7 |
| Water | 69.2 | 79.2 |
| Titanium dioxide | 15.4 | 15.4 |
| Imperial Red (X-1148) or Imperial Green (A-8028) | 7.7 | 7.7 |
| Rubber latex (60%) | 100.0 | 50.0 |
| Ammonium hydroxide (28%) | | 5.0 |

The polyvinyl alcohol is dissolved in the water, the pigments added, and thorough mixing is effected in a paint mill. The dispersion of pigments is aided by the polyvinyl alcohol. The latex is then gradually stirred in to secure a uniform ink, the ammonium hydroxide being added first when used. The colored pigments listed in the formula are sold by the Imperial Paper and Color Corp., of Glens Falls, New York; but it will be understood that they are given merely by way of illustration.

This colored ink may be used for printing or coating the film backing (such as regenerated cellulose), the latter first being preferably primed (such as with the primer set forth in Example 2), and the colored printing or coating being preferably covered with a further coating of transparent primer before applying the adhesive.

Formaldehyde and ammonia may be included to render the polyvinyl alcohol more water-resistant as hereinbefore mentioned.

EXAMPLE 7 (INK)

*Part A*

| | |
|---|---|
| Polyvinyl alcohol | 375 |
| Water | 3375 |

*Part B*

| | |
|---|---|
| Part A solution | 500 |
| Titanium dioxide | 100 |
| Imperial Red or Imperial Green | 50 |

The part A solution is made by dissolving the polyvinyl alcohol in water. 500 parts of this are used in making part B, the pigments being ground in by use of a paint mill. Then to part B is added the remainder of part A (3250 parts), with thorough mixing to secure a homogeneous product.

The resultant polyvinyl alcohol ink solution may be used for coating or printing the hydrophilic backing film as hereinbefore described (see Fig. 10 for example), and anchors firmly thereto.

Formaldehyde and ammonia may be included to render the polyvinyl alcohol more water-resistant.

Adhesive Example 1

| | Parts by weight |
|---|---|
| Milled latex crepe | 250 |
| Ester gum (acid number of 2–10) | 175 |
| "Flectol B" (antioxidant) | 1.25 |
| Heptane (volatile solvent) | 1550 |
| Alcohol (viscosity reducer) | 15.5–31 |

The raw latex crepe is milled for about 10 minutes, at a temperature of about 140–150° F., and is then cut into small pieces. The ester gum is dissolved in an equal amount of the solvent, and the "Flectol B" is likewise dissolved in a portion of the solvent. The balance of the solvent is placed in a suitable churn and the various ingredients added and churned until a homogeneous solution is obtained. The resulting adhesive solution is then ready for coating upon the primed cellulose film, to form, upon evaporation of the solvent, a normally tacky and pressure-sensitive transparent adhesive coating of such high cohesive strength that internal yielding will not occur to cause adhesive offsetting, when the adhesive sheet is stripped from surfaces to which temporarily applied, such as glass, cellulosic films, and wood. This adhesive coating is quite stretchy and hence adapted for use on stretchy backings such as polyvinyl alcohol films.

The alcohol is employed as a viscosity reducer to decrease the amount of solvent required to produce a solution of desired viscosity, and may be omitted with a compensatory increase of solvent. The alcohol may be denatured ethyl alcohol or may be methyl alcohol, for example. The "Flectol B" (a liquid condensation product of acetone and aniline) is a well known rubber anti-oxidant and may be substituted for by others, such as beta-naphthol and "Solux" (p-hydroxy-N-phenyl-morpholine).

A feature of the present primer is that adhesive solutions of this type may be applied without washing off or damaging the primer film.

As previously mentioned, a coloring pigment may be incorporated in the adhesive. This may be conveniently accomplished by milling the pigment into the rubber during the preliminary milling of the latter. Thus para-toluidine red may be added to give a red color, or aluminum bronzing powder to give a silver color. Zinc oxide may be incorporated if desired.

Various other tack-producing resins compatible with rubber, may be used in place of the specified ester gum, such as for example, wood or gum rosin, hydrogenated rosin or ester gum, and hydrogenated coumarone and indene resins. Plasticizers and softening agents may be included.

Adhesive Example 2

| | Parts |
|---|---|
| Rubbery isobutylene polymer resin (52,000 molecular weight) | 100 |
| Hydrogenated indene resin of 145°–150° C. melting point | 40 |
| Plasticizing agent such as methyl abietate or hydrogenated methyl abietate | 20 |
| Softener, such as butyl stearate | 10 |
| Heptane (volatile solvent) | 700 |

The above example illustrates a transparent hydrophobic water-insoluble pressure-sensitive adhesive which contains no rubber, but which bonds firmly to the primer because of compatibility with the latex or rubber phase of the primer, or other organophilic bonding component such as illustrated in Example 4.

These adhesives may be compounded without the solvent, by milling the ingredients together, and then calendered or frictioned upon the primed backing.

Having described various embodiments of my invention for purposes of illustration, but without intent to be limited thereto, what I claim is as follows:

1. A transparent pressure-sensitive adhesive tape wound upon itself in roll form and comprising a flexible transparent regenerated cellulose film backing, a coextensive transparent primer film bonded to one side of said backing and essentially comprised of an intermixture of 100 parts rubber latex and 15–300 parts polyvinyl alcohol insolubilized in situ with formaldehyde, and an overlying coextensive transparent pressure-sensitive hydrophobic adhesive coating of the rubber-resin type bonded to the backing more firmly than if the primer were omitted; the adhesive tape being adapted to be unwound and removed from surfaces to which temporarily applied without delamination or offsetting of adhesive and being resistant to the effects of moisture and high humidities.

2. A transparent pressure-sensitive adhesive tape wound upon itself in roll form and comprising a flexible transparent hydrophilic film backing, a coextensive transparent primer film bonded to one side of said backing and an overlying coextensive transparent pressure-sensitive hydrophobic adhesive coating bonded to said primer film, the primer film essentially comprising an intermixture of polyvinyl alcohol insolubilized in situ with an aldehyde anchoring it to the backing film and an organophilic bonding material compatible with and anchoring it to the adhesive coating, there being 15–300 parts by weight of said polyvinyl alcohol per 100 parts of said organophilic bonding material such that the adhesive coating is united at least about 50% more firmly to the backing than if said primer were omitted, and said adhesive tape can be unwound, and removed from surfaces to which temporarily applied, without delamination or offsetting of adhesive, and being resistant to the effect of moisture and high humidities.

ROBERT ISHAM COULTER.